US010071936B2

(12) United States Patent
Goetz et al.

(10) Patent No.: US 10,071,936 B2
(45) Date of Patent: Sep. 11, 2018

(54) METHOD FOR MAKING CERAMIC MATRIX COMPOSITE ARTICLES

(71) Applicants: Rolls-Royce Corporation, Indianapolis, IN (US); Rolls-Royce High Temperature Composites, Inc., Cypress, CA (US)

(72) Inventors: Anthony Martin Goetz, Orange, CA (US); Robert Shinavski, Mission Viejo, CA (US); Stephen Isaiah Harris, Long Beach, CA (US); Sean E. Landwehr, Avon, IN (US)

(73) Assignees: Rolls-Royce Corporation, Indianapolis, IN (US); Rolls-Royce High Temperature Composites, Inc., Cypress, CA (US)

(*) Notice: Subject to any disclaimer, the term of this patent is extended or adjusted under 35 U.S.C. 154(b) by 0 days.

(21) Appl. No.: 15/460,990

(22) Filed: Mar. 16, 2017

(65) Prior Publication Data
US 2017/0183268 A1    Jun. 29, 2017

Related U.S. Application Data

(63) Continuation of application No. 14/864,082, filed on Sep. 24, 2015, now Pat. No. 9,630,885.
(Continued)

(51) Int. Cl.
*C04B 35/80* (2006.01)
*C04B 35/626* (2006.01)
(Continued)

(52) U.S. Cl.
CPC ......... *C04B 35/806* (2013.01); *C04B 35/624* (2013.01); *C04B 35/6261* (2013.01);
(Continued)

(58) Field of Classification Search
CPC ......... B32B 9/007; C04B 41/52; C04B 41/89; C04B 35/71; C04B 35/80
See application file for complete search history.

(56) References Cited

U.S. PATENT DOCUMENTS 5,024,978 A   6/1991  Allaire et al.
5,154,787 A   10/1992 Gardner et al.
(Continued)

FOREIGN PATENT DOCUMENTS

WO    2008093078 A1    8/2008

OTHER PUBLICATIONS

Omatete et al., "Gelcast Reaction Bonded Silicon Nitride Composites," Ceramic Engineering & Science Proceedings, 12 [7-8], The American Ceramic Society, 1991, 8 pp.
(Continued)

*Primary Examiner* — Noah S Wiese
(74) *Attorney, Agent, or Firm* — Shumaker & Sieffert, P.A.

(57) ABSTRACT

A method of forming a composite article includes impregnating an inorganic fiber preform with a slurry composition. The slurry composition includes a particulate, a solvent, and a pre-gellant material. Gelling of the pre-gellant material in the slurry composition is initiated to immobilize the particulate and yield a gelled article, and substantially all solvent is removed from the gelled article to form a green composite article. The green composite article is then infiltrated with a molten infiltrant to form the composite article.

24 Claims, 2 Drawing Sheets

Related U.S. Application Data

(60) Provisional application No. 62/054,765, filed on Sep. 24, 2014.

(51) Int. Cl.
*C04B 35/622* (2006.01)
*C04B 35/624* (2006.01)
*C04B 35/65* (2006.01)
*C04B 35/657* (2006.01)

(52) U.S. Cl.
CPC .... *C04B 35/6264* (2013.01); *C04B 35/62281* (2013.01); *C04B 35/65* (2013.01); *C04B 35/657* (2013.01); *C04B 2235/3826* (2013.01); *C04B 2235/48* (2013.01); *C04B 2235/5244* (2013.01); *C04B 2235/616* (2013.01); *C04B 2235/656* (2013.01); *C04B 2235/6581* (2013.01)

(56) References Cited

U.S. PATENT DOCUMENTS

| | | | |
|---|---|---|---|
| 5,250,243 A | 10/1993 | Allaire et al. | |
| 5,294,264 A | 3/1994 | Tiegs et al. | |
| 5,296,311 A * | 3/1994 | McMurtry | C04B 35/573 428/388 |
| 5,336,522 A * | 8/1994 | Balhadere | C04B 35/571 427/226 |
| 5,399,440 A * | 3/1995 | Lespade | C03C 14/00 428/293.4 |
| 5,552,352 A | 3/1996 | Brun et al. | |
| 5,512,351 A * | 4/1996 | Miyamichi | B32B 5/26 427/228 |
| 5,547,622 A * | 8/1996 | Chalasani | C04B 35/63416 156/89.11 |
| 5,569,422 A * | 10/1996 | Astier | B28B 1/52 156/89.11 |
| 5,602,197 A | 2/1997 | Johnson et al. | |
| 5,840,221 A | 11/1998 | Lau et al. | |
| 5,854,154 A * | 12/1998 | Radford | C04B 35/624 264/621 |
| 6,024,898 A * | 2/2000 | Steibel | C04B 35/806 264/29.1 |
| 6,309,703 B1 * | 10/2001 | Wapner | C04B 35/83 427/288 |
| 6,624,105 B2 * | 9/2003 | Kagawa | C04B 35/486 428/293.4 |
| 2006/0043628 A1 | 3/2006 | Matsumoto | |
| 2006/0147622 A1 | 7/2006 | Gray | |
| 2011/0150663 A1 | 6/2011 | Manicke et al. | |
| 2012/0280430 A1 * | 11/2012 | Jones | B29C 35/0272 264/400 |
| 2016/0083305 A1 | 3/2016 | Goetz et al. | |

OTHER PUBLICATIONS

Sajgalik et al., "Additive-free hot-pressed silicon carbide ceramics—A material with exceptional mechanical properties," Journal of the European Ceramic Society, Dec. 2015, 9 pp.

European Search Report from counterpart Application No. 15186454.3, dated Feb. 10, 2016, 10 pp.

Chen et al. 30 Cf/SiC-ZrC-ZrB2 composites fabricated via sol-gel process combined with reactive melt infiltration. Journal of the European Ceramic Society 36 (2016) 3607-3613.

Prosecution History from U.S. Appl. No. 14/864,082, dated Dec. 7, 2016 through Mar. 6, 2017, 15 pp.

Examination Report from counterpart European Application No. 15186454.3, dated Mar. 5, 2018, 7 pp.

\* cited by examiner

US 10,071,936 B2

METHOD FOR MAKING CERAMIC MATRIX COMPOSITE ARTICLES

This application is a continuation of U.S. application Ser. No. 14/864,082, filed Sep. 24, 2015, which claims the benefit of U.S. Provisional Application No. 62/054,765, filed Sep. 24, 2014, both of which are incorporated by reference in their entirety.

BACKGROUND

Reinforced ceramic matrix composite articles (CMCs) are well suited for structural applications because of their toughness, thermal resistance, high temperature strength and chemical stability. To make a CMC article, fiber is initially shaped to create a preform, the preform is then rigidized with a ceramic phase(s) and the porosity within the preform is filled with a ceramic slurry bonded by a molten alloy infiltrant.

For example, silicon carbide (SiC) matrix composites have been made by infiltrating a silicon carbide slurry into a porous fiber preform to form a green composite article. A molten alloy infiltrant material including silicon (Si) may then be introduced into the green composite article using capillary forces to densify the structure to less than about 5% porosity and form a CMC article.

To most effectively infiltrate the pores of the fiber preform with slurry, the slurry should have a relatively low viscosity. However, the SiC particles in the slurry should be maintained within the pores of the preform to ensure optimum densification of the article during this step as well as to ensure that the molten alloy infiltrant is efficiently wicked into the slurry infiltrated green composite article. A small amount of slurry can be lost from the preform pores after slurry infiltration, and this effect becomes particularly acute with lower slurry viscosities.

SUMMARY

Pressure casting has been used to dry the SiC slurry in situ within the preform pores, but pressure casting can create a SiC slurry gradient within the preform, and this gradient can produce a similar gradient of the molten alloy infiltrant in the CMC article. Drying by pressure casting or any other method that imposes a gradient in the drying of the slurry, including isothermal drying, can result in a gradient and redistribution of the SiC particulate in the green composite article as drying progresses. Such non-uniformities can impact the capillary forces on the molten alloy infiltrant material and affect the performance of the final CMC article.

To improve the uniformity of infiltration of the slurry particulate into the pores of the preform, and ensure that the particles in the slurry remain in the preform pores during subsequent processing steps, the present disclosure is directed to method in which the slurry includes a pre-gellant material. After the slurry infiltrates into the pores of the preform, the pre-gellant material can be at least partially gelled, which can provide a network to more effectively retain the evenly distributed slurry particulate in the preform pores during subsequent processing steps. The resulting slurry-infiltrated green composite article is more uniformly infiltrated with slurry and particulate, which can maximize the efficiency of subsequent molten alloy infiltration steps and reduce residual porosity within the finished article.

In one aspect, the present disclosure is directed to a method of forming a composite article. The method includes impregnating an inorganic fiber preform with a slurry composition, wherein the slurry composition includes a particulate, a solvent, and a pre-gellant material; initiating gelation of the pre-gellant material in the slurry composition to immobilize the particulate and yield a gelled article; removing substantially all solvent from the gelled article to form a green composite; and infiltrating the green composite article with a molten infiltrant to form the composite article.

In another aspect, the present disclosure is directed to a method of forming a CMC article. The method includes impregnating a ceramic fiber preform with a slurry composition, wherein the slurry composition includes at least one ceramic material, a monomeric pre-gellant material, and a solvent; initiating gelling of the slurry composition to at least partially polymerize the monomeric pre-gellant material and yield a gelled green composite article; and infiltrating the gelled green composite article with a metal alloy infiltrant composition to form the CMC article.

In yet another aspect, the present disclosure is directed to a method of forming a CMC article. The method includes infiltrating a ceramic fiber preform with a slurry composition, wherein the slurry composition includes a ceramic material, a monomeric pre-gellant material, a polymerization initiator and an aqueous solvent; heating the slurry composition to a temperature of about 30° C. to about 80° C. to at least partially polymerize the monomeric pre-gellant material and form a gel in interstices between fibers of the preform and yield a green composite article; and infiltrating the gelled green composite article with a metal alloy infiltrant composition comprising Si to form the CMC article, and wherein the CMC article has a porosity of less than about 5%.

In yet another aspect, the present disclosure is directed to a CMC article including ceramic fibers in a matrix of SiC, wherein the article has a residual porosity of less than about 5% and a uniform distribution of SiC particles in interstices between the ceramic fibers.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
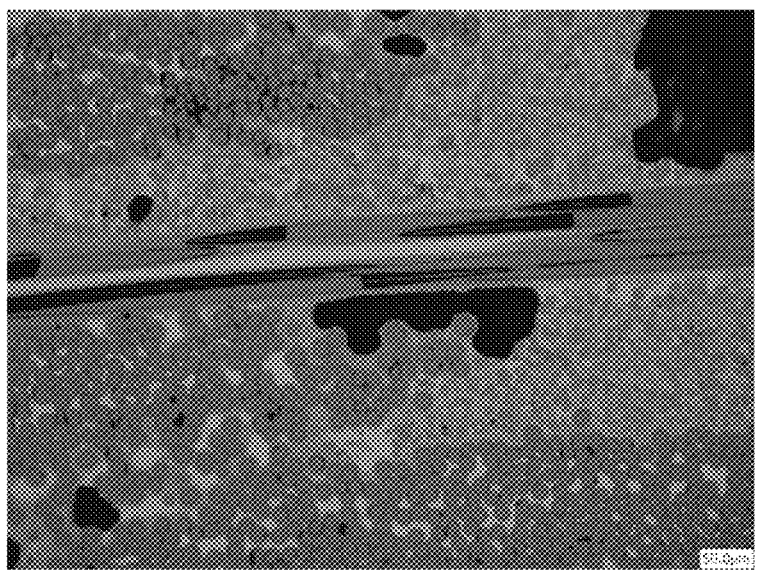
FIG. 1 is a photograph of a cross-section of a CMC article made according to Comparative Example 1.

The process for making a composite article begins with the fabrication of a two-dimensional or three-dimensional inorganic fiber preform, which forms a structural scaffold for subsequent infiltration of a ceramic matrix. To make the inorganic fiber preform, chopped fibers, continuous fibers, woven fabrics or combinations thereof are laid up, fixed and shaped into the configuration of a desired component. The fibers in the inorganic fiber preform can be made from any inorganic material that is stable at processing temperatures above about 1000° C. and is compatible with the temperature of the molten alloy infiltrant. Suitable examples include, but are not limited to, aluminum oxide ($Al_2O_3$), mullite ($Al_6Si_2O_{13}$), zirconium oxide ($ZrO_2$), carbon (C), graphite, silicon carbide (SiC), silicon carbon nitride, silicon nitride, and mixtures and combinations thereof. Suitable commercially available inorganic fibers include, for example, pre-ceramic SiC fibers such as those available under the trade designation HI-NICALON and SYLRAMIC from COI Ceramics, Inc., San Diego, Calif.

In some embodiments, the inorganic fibers in the preform may be treated by applying a coating or coatings to, for example, provide a compliant layer at an interface between the fibers and the matrix composed of subsequently introduced particles or components of the particle-containing slurry and molten alloy infiltrant to enhance toughness and crack deflection in the final composite article and/or to prevent reaction of the reinforcing fibers with the molten alloy infiltrant. Suitable coatings include, but are not limited to, carbon, aluminum nitride, boron nitride, silicon nitride, silicon carbide, boron carbide, metal borides, transition metal silicides, transition metal oxides, transition metal silicates, rare earth metal silicates and mixtures and combinations thereof. If used, in various embodiments the fiber coating has a thickness of about 0.05 µm to 15 µm, or about 0.1 µm to about 5 µm.

Once the preform is shaped and rigidized, a matrix material is infiltrated into the preform. This infiltration process includes applying to the preform a slurry having dispersed therein particles including, but not limited to, ceramic materials. As the slurry flows into the interstices between the inorganic fibers of the preform, the particles in the slurry substantially uniformly impregnate the pores of the preform and come to reside in the interstices between the preform fibers.

In various embodiments, the slurry utilized in the process of the present disclosure includes particles, a pre-gellant material, an optional gelation initiator or promoter, optional additives, and a solvent.

In various embodiments, the particles in the slurry include aluminum nitride, aluminum diboride, boron carbide, aluminum oxide, mullite, zirconium oxide, carbon, silicon carbide, silicon nitride, transition metal nitrides, transition metal borides, rare earth oxides, and mixtures and combinations thereof.

The size of the particles may vary widely, and typically have a major dimension of less than about 50 µm. In various embodiments, the particles may have a wide variety of regular or irregular shapes including, for example, spheres, rods, disks, and the like. In various embodiments, the major dimensions of the particles may form a monomodal, a bimodal, or a multimodal distribution. In some embodiments, the particles are generally spheres with a diameter of less than about 50 µm, and the diameters of the particles make up a multimodal distribution to more effectively flow within the fibers of the preform and pack more densely within the pores of the preform.

The pre-gellant material may include any material that can be processed to form a gel-like network within the interstices of the fibers of the preform to evenly distribute and effectively retain the ceramic materials within the preform as the preform is subsequently processed. In this application the term gel refers to a viscous, jelly-like colloid including a disperse phase of the particles.

In one embodiment, the pre-gellant material includes a polysaccharide such as, for example, methyl cellulose, carboxymethyl cellulose, hydroxypropyl methyl cellulose, gellan gum, agarose, carrageenan, and mixtures and combinations thereof. In some embodiments, the slurry composition may optionally further include a gelation initiator or promoter such as a monovalent or a divalent salt.

In another embodiment, the pre-gellant material includes one or more gelation monomers which, when polymerized, form a gel within the pores of the preform. In various embodiments, the monomeric pre-gellant material may include, but are not limited to, acrylamides, acrylates, vinyls, allyls, and mixtures and combinations thereof. The gelation monomers may optionally include one, two, or more functional groups such as, for example, (meth)acryl, acrylamido, vinyl, allyl, and the like.

In some embodiments, the slurry can include an optional polymerization initiator to aid gelation of the pre-gellant material. The polymerization initiator may vary widely depending on the selected monomeric pre-gellant material, and in various example embodiments may include a peroxide, a persulfate, a perchlorate, an amine, an azo compound, and mixtures and combinations thereof.

In some embodiments, the monomeric pre-gellant material can include at least one first monomeric material that polymerizes to produce linear polymer chains, and a second monomeric material that polymerizes to produce cross-links between the linear polymer chains and further aid gelation. In one example embodiment, the first monomeric material can include N,N-dimethylacrylamide (DMAA, which produces linear polyacrylamide chains). The second monomeric material can include N,N'-methylenebisacrylamide (MBAM), which crosslinks between the linear chains.

The first and the second monomeric materials making up the monomeric pre-gellant material can be present in the slurry in any suitable ratio, and considerations in selecting the ratio include solubility in a selected slurry solvent, gelation temperatures, the desired viscosity of the slurry, consistency and viscosity of the resultant gelled slurry, gelation time, and the like. In one embodiment, the first monomeric material DMAA and the second monomeric material MBAM are present in the slurry at a ratio of about 1:1 to about 1:30.

In one example embodiment including first monomer DMAA and second monomer MBAM discussed above, a suitable polymerization initiator includes 2,2'-Azobis[2-(2-imidazoline-2-yl)propane] 2HCl (AZIP). Other suitable examples include free radical initiators, but are not limited to ammonium persulfate/tetramethyl ethylene diamine (APS-TEMED), and azobis (2-amidinopropane) HCl (AZAP), and mixtures and combinations thereof.

The slurry also includes a solvent selected to disperse or dissolve the monomeric pre-gellant material and the optional polymerization initiator. In various embodiments, the solvent is aqueous (includes a major amount of water), or is water. Other solvents that can be used in the slurry include, but are not limited to, alcohols.

In various embodiments, the slurry may optionally include less than about 10 wt % of additives such as, for example, dispersants, binders, surfactants, pH adjustors, and the like.

In various embodiments, the slurry can include about 30 wt % to about 90 wt % of particles, about 0.5 wt % to about 30 wt % of pre-gellant material, about 0.1 wt % to about 10 wt % of a polymerization initiator, about 0.25 wt % to about 20 wt % additives, and about 10 wt % to about 70 wt % water.

In various embodiments, the slurry includes a SiC solids content of about 60 wt % to about 80 wt %, and the SiC includes coarse spherical particles with a diameter of about 15 µm and fine spherical particles with a diameter of about 1 µm.

To make the slurry composition, the particles, the pre-gellant material, the solvent, and any optional polymerization initiator or other additives are combined and optionally milled to ensure that the particles are dispersed and have an appropriate shape and size to most effectively flow, insert between, and lodge within the pores of the preform. Properties of the slurry such as, for example, pH, temperature, and the like may optionally be adjusted before, during, or after the milling process.

The preform is then immersed in the slurry composition. Prior to immersion, the preform fibers may optionally be prepared for slurry infiltration by exposing the fibers to a solution including, for example, water, solvents, surfactants and the like aid impregnation of the fibers. A vacuum may optionally be drawn prior to slurry introduction to purge gas from the preform and further enhance impregnation. The slurry infiltration may be conducted at any suitable temperature, and room temperature (about 20° C. to about 35° C.) has been found to be effective. The slurry infiltration may be enhanced by application of external pressure after slurry introduction, and a one atmosphere pressure gradient has been found to be effective.

Following slurry infiltration, the preform may optionally be heated to increase the rate at which the pre-gellant materials at least partially form a gel in the interstices between the preform fibers. The temperature selected to cause gel formation may vary widely depending on the pre-gellation materials and polymerization initiators (if any) selected for use in the slurry composition, but in some embodiments a temperature of about 30° C. to about 80° C., or about 35° C. to about 45° C., have been found to be suitable. The preform should be heated for a time sufficient to ensure that sufficient slurry gellation has occurred throughout the volume of the preform to maintain the ceramic particles within the pores of the preform during subsequent processing steps, and in various embodiments the temperature of the preform is maintained at the gellation temperatures discussed above for about 1 hour to about 4 hours, or about 2 hours to about 3 hours.

In some embodiments, after the slurry is sufficiently or fully gelled in the preform, excess gelled slurry is optionally removed from the fully slurry infiltrated preform. The excess gelled slurry can be removed from the preform by any suitable method, and mechanical surface treatment techniques like brushing or polishing with an abrasive article have been found to be suitable.

In some embodiments, prior to or following surface treatment, additional impregnation step(s) can be performed to ensure that the preform is fully impregnated with particles. The additional impregnation steps may be performed with the same or a different slurry composition as the initial impregnation step, or may include other materials such as, for example, a high char yielding resin, a pre-ceramic polymer, or mixtures thereof.

For example, a secondary slurry for use in the additional impregnation step(s) can include carbon black in a suitable solvent such polyvinylpyrrolidone, isopropanol, polyvinylalcohol, water, and mixtures thereof. In another non-limiting example, suitable high-char yielding resins can include phenolic flake dissolved in a suitable solvent such as an alcohol like isopropanol. In yet another non-limiting example, suitable pre-ceramic polymers can include polycarbosilane, polycarbosilazane, and mixtures and combinations thereof.

After the excess slurry is removed, the resulting cast is optionally at least partially dried to remove water or other solvents and form a green composite article. The drying may be conducted in any suitable manner, and in various example embodiments the cast can be dried at room temperature under vacuum at about 1 Torr, or may be dried at ambient pressure at a temperature of up to about 150° C. Increased drying temperatures may cause the gel to partially or fully decompose, and as such should be avoided.

Following the optional drying step, a molten metal alloy infiltrant is applied to the green composite article. The molten metal alloy wicks between the ceramic particles in the green composite article and occupies the interstices between the particles until the green composite article is fully densified to less than about 5%, or less than about 3%, or less than about 1%, porosity to form a composite article. In various embodiments, the alloy infiltrant includes Si, B, Al, Y, Ti, Zr, oxides thereof, and mixtures and combinations thereof.

In various embodiments, the temperature for metal alloy infiltration such as for example, Si, is about 1400° C. to about 1500° C., which in some embodiments can cause decomposition and substantially complete or partial removal of the gel. Under these conditions, the duration of the infiltration can be between about 15 minutes and 4 hours, or about 60 minutes to about 20 minutes. The infiltration process can optionally be carried out under vacuum, but in other embodiments can be carried out in inert gas under atmospheric pressure to limit evaporation losses.

In various embodiments, the final composite article includes about 20 vol % to 60 vol % coated fiber, or about 30 vol % to 50 vol %; about 1 vol % and 79 vol % infiltrated particles, or about 35 vol % to about 60 vol %; and about 1 vol % to about 79 vol % infiltrated alloy, or about 5 vol % to about 20 vol %. In various embodiments, a small amount of gelled material, typically less than about 1.0 wt %, or less than about 0.5 wt %, remains after the alloy infiltration step. The composite article includes no macroscopic porosity, which in this application means pores with an average pore size of less than about 200 µm, or less than about 50 µm, or less than about 2 µm, and includes a porosity of less than about 5%, or less than about 3%, or less than about 1%.

Following the alloy densification step, the final composite article may optionally be machined to form a suitable part for use in for example, a turbine engine or an aircraft engine.

The invention will now be described with reference to the following non-limiting examples.

EXAMPLES

Comparative Example 1—Thermally Dried Non-Gelling Sample

TABLE 1

| Material | Wt % |
| --- | --- |
| Trimodal distribution of SiC particles, diameters nominally 15:5:1 micron | 60-80 |
| Polyethyleneimine | 0.1-1.0 |
| Carboxymethyl Cellulose | 0.01-0.1 |
| Water | 20-40 |

The ceramic particles, water, and organic components listed in Table 1 were milled in a ball mill until an homogeneous slurry was produced with suitable particle size.

A fibrous partially CVI-SiC rigidized preform (Hi-Nicalon fabric rigidized with silicon carbide produced by chemical vapor infiltration) was infiltrated with the slurry under vacuum, then the preform and slurry were brought to 1 atmosphere of pressure.

The infiltrated part was dried under vacuum followed by an elevated temperature drying cycle at 150° C. and atmospheric pressure to form a porous green article.

The green article was infiltrated with a molten silicon alloy via capillary action under vacuum at a temperature between 1400-1500° C.

A cross-section of the resulting article is shown in FIG. 1.

Example 1—Gelled Slurry Sample

TABLE 2

| Material | Wt % |
| --- | --- |
| Trimodal distribution of SiC particles, diameters nominally 15:5:1 micron | 60-80 |
| Polyethyleneimine | 0.1-1.0 |
| Carboxymethyl Cellulose | 0.01-0.1 |
| Methylenebisacrylamide | 0.1-1.0 |
| Dimethylacrylamide | 0.1-1.0 |
| Water | 20-40 |

The ceramic particles, water, and organic components listed in Table 2 were milled in a ball mill at a temperature below 30° C. until an homogeneous slurry was produced with suitable particle size.

A fibrous partially CVI-SiC rigidized preform (Hi-Nicalon fabric rigidized with silicon carbide produced by chemical vapor infiltration) was infiltrated with the slurry under vacuum, then the preform and slurry were brought to 1 atmosphere of pressure.

The slurry and submerged parts were heated to a temperature between about 30° C. and about 80° C.

The infiltrated part was dried under vacuum followed by an elevated temperature drying cycle at 150° C. and atmospheric pressure to form a porous green article.

The green article was infiltrated with a molten silicon alloy via capillary action under vacuum at a temperature between 1400-1500° C.

Figure 2:
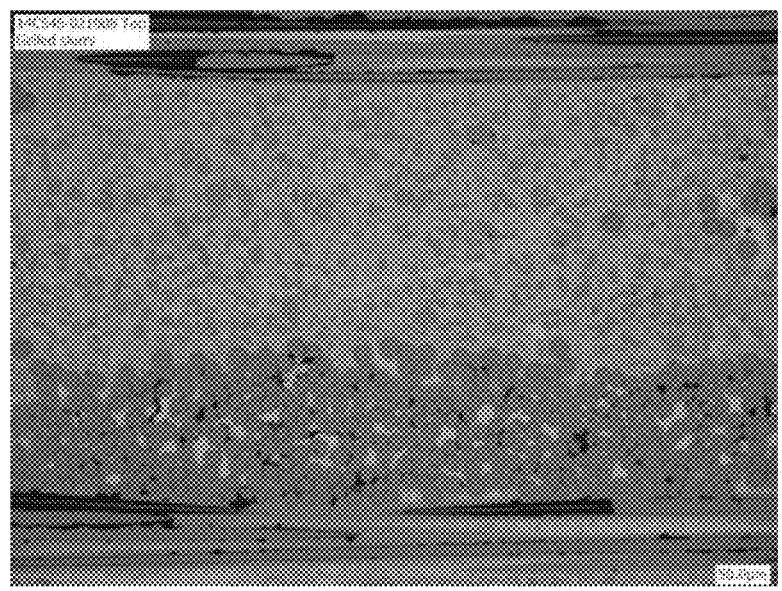
FIG. 2 is a photograph of a cross-section of a CMC article made according to Example 1.

A cross-section of the resulting article is shown in FIG. 2.

The article of FIG. 2 contains significantly less macroscopic porosity than the article shown in FIG. 1, and also contains fewer, and smaller regions of unfilled silicon.

Example 2—Prophetic Example

TABLE 3

| Material | Wt % | Vol % |
| --- | --- | --- |
| Large SiC | 61.57 | 39.86 |
| Small SiC | 13.68 | 8.86 |
| Polyethylene imine (PEI) | 0.75 | 1.23 |
| Water | 23.92 | 49.95 |
| Carboxymethyl cellulose | 0.07 | 0.10 |

Mill the components of Table 3, except carboxymethylcellulose, in a ball mill with appropriate milling media (SiC media is preferred to reduce contamination) until a slurry is formed and a suitable particle size distribution is achieved.

Measure temperature of slurry to ensure the temperature is <30° C. If temperature is too high the slurry should rest until cooled.

Pour carboxymethyl cellulose into the mill with the cooled slurry and allow to mill for another 30 minutes.

Pour slurry into a container with a CVI SiC rigidized Hi-Nicalon fiber preform that is under vacuum to impregnate the preform with slurry.

Remove the container from the vacuum chamber and heat to 70C and hold until gelation occurs.

Cool and remove excess gelled material then dry to remove water.

Example 3—Prophetic Example

TABLE 4

| Material | Wt % | Vol % |
| --- | --- | --- |
| Large SiC | 61.33 | 39.64 |
| Small SiC | 13.63 | 8.81 |
| Polyethylene imine (PEI) | 0.75 | 1.22 |
| Water | 23.82 | 49.67 |
| Agarose | 0.48 | 0.66 |

Add components of Table 4, except agarose, into a ball mill (with appropriate milling media (SiC media is preferred to reduce contamination), and mill the mixture until a slurry is formed and a suitable particle size distribution is achieved.

Pour the slurry into a heat resistant mixing vessel, and heat to 90° C. under agitation.

Once 90° C. has been reached add agarose, and mix for 20 minutes.

Pour slurry into a container with a CVI SiC rigidized Hi-Nicalon fiber preform that is under vacuum to impregnate the preform with slurry.

Remove the container from the vacuum chamber and allow to cool to room temperature. Gelation should occur below 35° C.

Cool and remove excess gelled material then dry to remove water.

Example 4—Prophetic Example

TABLE 5

| Material | Wt % | Vol % |
| --- | --- | --- |
| Large SiC | 61.47 | 39.77 |
| Small SiC | 13.66 | 8.84 |
| Polyethylene imine (PEI) | 0.75 | 1.23 |
| Water | 23.88 | 49.83 |
| Gellan Gum | 0.24 | 0.33 |
| Ammonium Chloride | 0.07 | — |

Add the following components of Table 5: SiC, PEI, and water, into a ball mill (with appropriate milling media (SiC media is preferred to reduce contamination), and mill the mixture until a slurry is formed and a desired particle size distribution is achieved.

Pour the slurry into a heat resistant mixing vessel, and heat to 90° C. under agitation.

Once 90° C. has been reached, add gellan gum and ammonium chloride, and mix for 20 minutes.

Pour slurry into a container with a CVI SiC rigidized Hi-Nicalon fiber preform that is under vacuum to impregnate the preform with slurry.

Remove the container from the vacuum chamber and allow to cool to room temperature. Gelation should occur between 30° C. and 40° C. upon cooling.

Cool and remove excess gelled material then dry to remove water.

Various embodiments of the invention have been described. These and other embodiments are within the scope of the following claims.

The invention claimed is:

1. An article comprising an inorganic fiber preform impregnated with a slurry composition, wherein the slurry composition comprises a particulate, a solvent comprising water, and a pre-gellant material, wherein the pre-gellant material comprises a monomer that is polymerizable to form a gel.

2. The article according to claim 1, wherein the slurry composition further comprises a free radical initiator selected from the group consisting of peroxides, persulfates, perchlorates, amines, azo compounds, and combinations thereof.

3. The article according to claim 1, wherein the monomer comprises one or more functional groups selected from the group consisting of acrylates, acrylamides, vinyls, allyls, and combinations thereof.

4. The article according to claim 1, where the particulate in the slurry is selected from the group consisting of aluminum nitride, aluminum diboride, boron carbide, aluminum oxide, mullite, zirconium oxide, carbon, silicon carbide, silicon nitride, transition metal nitrides, transition metal borides, rare earth oxides, and combinations thereof.

5. The article according to claim 1, wherein slurry composition is at a temperature of about 30° C. to about 80° C.

6. The article according to claim 1, wherein the inorganic fiber preform comprises fibers made from a material chosen from aluminum oxide ($Al_2O_3$), mullite ($Al_6Si_2O_{13}$), zirconium oxide ($ZrO_2$), carbon (C), graphite, silicon carbide, silicon carbonitride, silicon nitride, and combinations thereof.

7. The article according to claim 6, wherein the fibers of the inorganic fiber comprise at least one protective coating chosen from carbon, aluminum nitride, boron nitride, silicon nitride, silicon carbide, boron carbide, metal borides, transition metal silicides, transition metal oxides, transition metal silicates, rare earth metal silicates, and combinations thereof.

8. The article according to claim 1, wherein the solvent is water.

9. An article comprising an inorganic fiber preform impregnated with a slurry composition, wherein the slurry composition comprises a particulate, an aqueous solvent, a pre-gellant material, wherein the pre-gellant material comprises a polysaccharide chosen from methyl cellulose, carboxymethyl cellulose, hydroxypropyl methyl cellulose, gellan gum, agarose, carrageenan, and combinations thereof; and an amine compound to aid gelation of the pre-gellant material.

10. The article according to claim 9, wherein the slurry composition further comprises a monovalent or divalent salt.

11. The article according to claim 9, where the particulate in the slurry is selected from the group consisting of aluminum nitride, aluminum diboride, boron carbide, aluminum oxide, mullite, zirconium oxide, carbon, silicon carbide, silicon nitride, transition metal nitrides, transition metal borides, rare earth oxides, and combinations thereof.

12. The article according to claim 9, wherein the solvent comprises water.

13. The article according to claim 9, wherein slurry composition is at a temperature of about 30° C. to about 80° C.

14. The article according to claim 9, wherein the inorganic fiber preform comprises fibers made from a material chosen from aluminum oxide ($Al_2O_3$), mullite ($Al_6Si_2O_{13}$), zirconium oxide ($ZrO_2$), carbon (C), graphite, silicon carbide, silicon carbonitride, silicon nitride, and combinations thereof.

15. The article according to claim 14, wherein the fibers comprise at least one protective coating chosen from carbon, aluminum nitride, boron nitride, silicon nitride, silicon carbide, boron carbide, metal borides, transition metal silicides, transition metal oxides, transition metal silicates, rare earth metal silicates, and combinations thereof.

16. The article according to claim 9, wherein the amine compound is polyethyleneimine.

17. The article according to claim 9, wherein the slurry composition further comprises N,N-dimethylacrylamide and N,N'-methylenebisacrylamide.

18. A ceramic fiber preform impregnated with a slurry composition, wherein the slurry composition comprises:
   at least one ceramic material;
   a monomeric pre-gellant material comprising at least one of N,N-dimethylacrylamide and N,N'-methylenebisacrylamide; and
   a solvent.

19. The preform according to claim 18, wherein the ratio of N,N-dimethylacrylamide to N,N'-methylenebisacrylamide in the slurry composition is about 1:1 to about 1:30.

20. The preform according to claim 18, wherein the slurry composition is at a temperature of about 30° C. to about 80° C.

21. The preform according to claim 18, wherein the inorganic fiber preform comprises fibers made from a material chosen from aluminum oxide ($Al_2O_3$), mullite ($Al_6Si_2O_{13}$), zirconium oxide ($ZrO_2$), carbon (C), graphite, silicon carbide, silicon carbonitride, silicon nitride, and combinations thereof.

22. The preform according to claim 21, wherein the fibers comprise at least one protective coating chosen from carbon, aluminum nitride, boron nitride, silicon nitride, silicon carbide, boron carbide, metal borides, transition metal silicides, transition metal oxides, transition metal silicates, rare earth metal silicates, and combinations thereof.

23. The preform according to claim 18, wherein the solvent comprises water.

24. The preform according to claim 18, wherein the solvent is water.

* * * * *